United States Patent [19]

Hums

[11] Patent Number: 4,814,318
[45] Date of Patent: Mar. 21, 1989

[54] CATALYST CARRIER MATERIAL AND METHOD FOR PRODUCING THE SAME

[75] Inventor: Erich Hums, Erlangen, Fed. Rep. of Germany

[73] Assignee: Siemens Aktiengesellschaft, Berlin and Munich, Fed. Rep. of Germany

[21] Appl. No.: 100,638

[22] Filed: Sep. 24, 1987

[30] Foreign Application Priority Data

Sep. 30, 1986 [DE] Fed. Rep. of Germany ....... 3633229

[51] Int. Cl.$^4$ .......................... B01J 21/04; B01J 23/02
[52] U.S. Cl. ..................................... 502/439; 502/432
[58] Field of Search ............................... 502/439, 432

[56] References Cited

U.S. PATENT DOCUMENTS 2,762,782  9/1956  Kimberlin ........................... 502/432
4,188,365  2/1980  Yoshioka et al. ................ 423/239 A
4,587,232  5/1986  Kawamura ......................... 502/439

Primary Examiner—Peter D. Rosenberg
Attorney, Agent, or Firm—Herbert L. Lerner; Laurence A. Greenberg

[57] ABSTRACT

A catalyst carrier material formed of titanium dioxide and a method of producing the same, includes a mixture of meta and ortho-titanic acid doped with additives which contribute to the stabilization of the crystalline lattice. The mixture is agglomerated under hydrothermal conditions.

5 Claims, No Drawings

CATALYST CARRIER MATERIAL AND METHOD FOR PRODUCING THE SAME

The invention relates to a catalyst carrier material formed of titanium dioxide and a method for producing the same.

In order to reduce nitrogen oxides in flue gases, it is known to use catalysts which contain titanium dioxide as a carrier material to which additional oxides such as vanadium oxide, tungsten oxide or molybdenum oxide are added in various quantities.

A catalyst of this kind is disclosed, for instance, in German Patent DE-PS No. 24 58 888, corresponding to U.S. Pat. No. 4,085,193. It is a characteristic of such catalysts that the catalytic activity depends very greatly on what modification or crystalline structure is present in the titanium dioxide used as the carrier material. When reducing nitrogen oxides, the anastase modification of the titanium dioxide is preferred. Conversely, the use of the rutile modification produces much lower catalytic activities.

The anastase modification of the titanium dioxide tends to convert into the more-stable rutile modification. This process is irreversible. The conversion or phase transformation from one crystalline structure to the other evidently is a combination of two different processes: a process of nucleation with relatively a high activation energy, and a nucleus growth process with a comparably lower activation energy.

The phase transformation can be accelerated by adding foreign ions. During the combination of titanium dioxide in the anastase modification with suitably applied catalytically active metals, this effect of rutilization must be taken into account. Often it must be accepted that the unfavorably selected but compulsory combination of carrier material and applied metals simultaneously represents an acceleration effect for the rutilization. This has been shown by tests of the influence of $V_2O_5$ on the anastase lattice when hydrothermally produced titanium dioxide is produced. This acceleration effect is markedly greater when copper, nickel, cobalt and molybdenum compounds are used. The ion size, the charge and the tendency of being octahedrally coordinated, play a substantial role.

It is accordingly an object of the invention to provide a catalyst carrier material and a method for producing the same, which overcomes the hereinafore-mentioned disadvantages of the heretofore-known products of this general type and to stabilize titanium dioxide produced under hydrothermal conditions and present in the anastase modification, in order to suppress conversion into the rutile form during further processing with other catalytically active components.

With the foregoing and other objects in view there is provided, in accordance with the invention, a catalyst carrier material formed of titanium dioxide, comprising a mixture of meta and ortho-titanic acid doped with additives which contribute to the stabilization of the crystalline lattice, the mixture being agglomerated under hydrothermal conditions.

In accordance with another feature of the invention, there is provided at least one of the materials from the group consisting of phosphate and/or sulfate and/or borate ions used for stabilization.

In accordance with a further feature of the invention, there are provided rare earths used for stabilization.

In accordance with an added feature of the invention, the rare earths are lanthanum compounds.

In accordance with a concomitant feature of the invention, there is provided at least one of the materials from the group consisting of $Si^{4+}$ and/or $Al^{3+}$ and/or $Zr^{4+}$.

With the objects of the invention in view, there is also provided a method of producing a catalyst carrier material formed of titanium dioxide, which comprises mixing meta and ortho-titanic acid doped with additives which contribute to the stabilization of the crystalline lattice, and subsequently agglomerating the mixture under hydrothermal conditions.

The invention is based on the recognition that the conversion from the anastase modification into the rutile modification can also be hindered by means of additives to the titanium dioxide. It was found that certain additives have the property of hindering nucleus growth in the crystalline structure.

As mentioned above, according to a particularly advantageous feature of the invention, the anastase modification can be stabilized by additives of phosphate, sulfate and/or borate ions. A probable factor in this stabilization is that when these ions are incorporated into the crystalline lattice, they occupy intermediate lattice spaces that block the process of conversion from the anastase modification to the rutile modification. It has been assumed that the conversion mechanism takes place on the atomic level and that oxyen voids in the anastase lattice facilitate this phase transformation, because they reshape the oxygen framework of the anastase and promote the occupation of the newly created lattice spaces by titanium ions. In a reversal of this assumption, foreign ions at intermediate lattice spaces can inhibit this conversion, by means of the phosphate, sulfate or borate ions mentioned above.

When producing this kind of hydrothermally produced titanium dioxide stabilized in accordance with the invention, the method steps are carried out in such that the rutilization-inhibiting additives are added prior to the step of structure agglomeration of meta or ortho-titanic acid. This can be done, for example, by providing that once the meta or ortho-titanic acid is present in cleaned form, phosphate and/or sulfate and/or borate and/or lanthanum compounds are added and then are treated at increased pressure and temperature in an agitator-type autoclave.

Other features which are considered as characteristic for the invention are set forth in the appended claims.

Although the invention is illustrated and described herein as embodied in a catalyst carrier material and a method for producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the description of the specific embodiments.

I claim:

1. Catalyst carrier material formed of titanium dioxide, comprising a mixture of meta and ortho-titanic acid doped with additives in the form of rare earths other than cerium which contribute to the stabilization of the crystalline lattice, the mixture being agglomerated under hydrothermal conditions.

2. Catalyst carrier material according to claim 1, wherein the additives are at least one of the materials from the group consisting of phosphate, sulfate and borate ions used for stabilization.

3. Catalyst carrier material according to claim 1, wherein the rare earths are lanthanum compounds.

4. A catalyst carrier material as defined by claim 1, wherein the additives are at least one of the materials from the group consisting of $Si^{4+}$, $Al^{3+}$ and $Zr^{4+}$.

5. Method of producing a catalyst carrier material formed of titanium dioxide, which comprises mixing meta and ortho-titanic acid doped with additives in the form of rare earths other than cerium which contribute to the stabilization of the crystalline lattice, and subsequently agglomerating the mixture under hydrothermal conditions.

* * * * *